United States Patent [19]

Nomura et al.

[11] 4,244,514
[45] Jan. 13, 1981

[54] ELECTRONIC TRIP METER WITH AN ALARM FOR AN AUTOMOTIVE VEHICLE

[75] Inventors: Hiroyuki Nomura; Takaaki Mogi; Teruo Kawasaki, all of Yokohama; Masanori Mizote, Yokosuka; Kiyoshi Yamaki, Yokohama; Takashi Oka, Tokyo; Hideoki Matsuoka, Yokohama, all of Japan

[73] Assignee: Nissan Motor Company, Limited, Yokohama, Japan

[21] Appl. No.: 969,310

[22] Filed: Dec. 13, 1978

[30] Foreign Application Priority Data

Dec. 21, 1977 [JP] Japan .................................. 52-154881

[51] Int. Cl.³ .......................... G06F 15/20; G06M 3/14
[52] U.S. Cl. ............................ 235/92 DN; 235/92 PE; 235/92 EV; 364/424
[58] Field of Search ........ 235/92 DN, 92 EV, 92 PE, 235/92 CA; 340/23; 364/444, 460, 561, 424

[56] References Cited

U.S. PATENT DOCUMENTS

| 3,780,272 | 12/1973 | Rohner | 235/92 DN |
| 3,809,864 | 5/1974 | Sampey | 235/92 DN |
| 3,925,641 | 12/1975 | Kashio | 340/23 |
| 4,031,363 | 6/1977 | Freeman et al. | 235/92 DN |

Primary Examiner—Joseph M. Thesz

[57] ABSTRACT

An electronic trip meter with an alarm for an automotive vehicle comprises a travelled distance sensing circuit, a memory circuit, a modification circuit, comparators, an alarm, first and second counters, a subtractor, a display circuit, and other auxiliary circuits. A plurality of sub distances defined by guide points along a course and a total distance of the course are respectively preset in the memory circuit and the second counter. The second counter output signal indicates a distance remaining to the goal of the course for displaying the remaining distance. The modification circuit output signal indicates a distance shorter than a sub distance while the first counter output signal indicates a distance actually travelled. When the vehicle travells over the distance shorter than the sub distance, the alarm is energized, by means of a comparison of the distances for informing the driver that a next guide point is near. Simultaneously, a distance remaining to the next guide point is displayed for a predetermined period of time.

12 Claims, 6 Drawing Figures

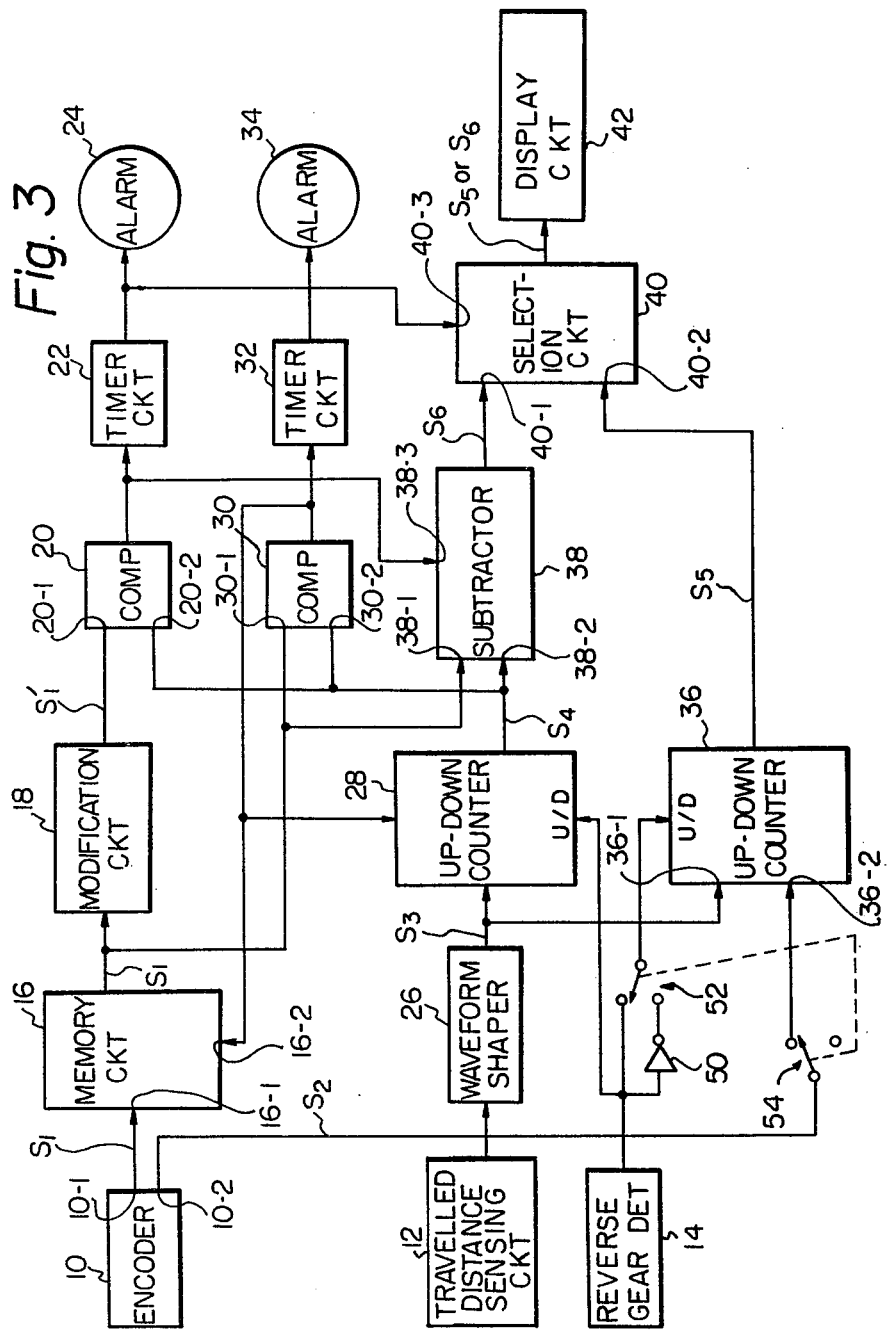

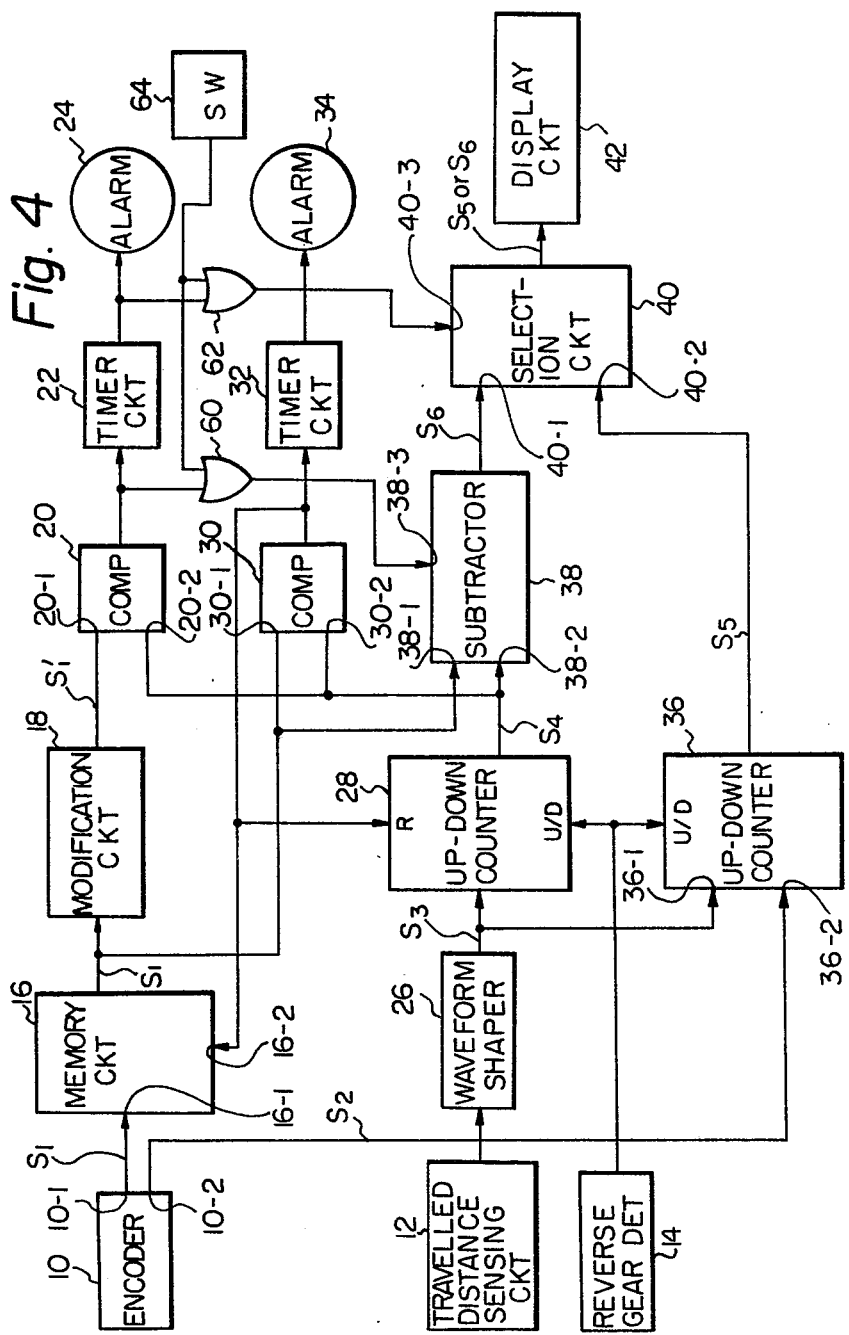

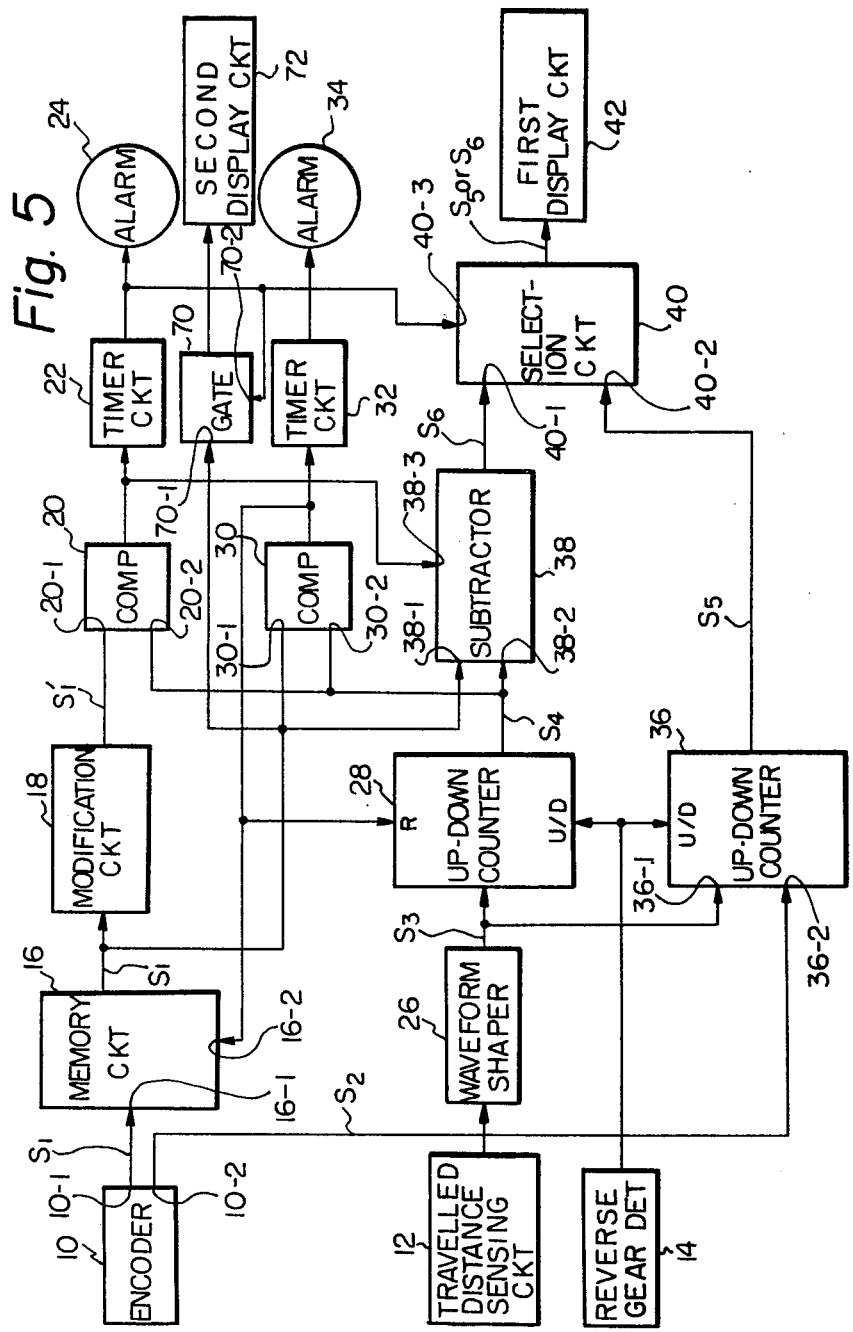

ELECTRONIC TRIP METER WITH AN ALARM FOR AN AUTOMOTIVE VEHICLE

FIELD OF THE INVENTION

The present invention generally relates to a trip meter for a motor vehicle. More particularly, the present invention relates to an electronic trip meter.

BACKGROUND OF THE INVENTION

Generally conventional type of trip memters are of the mechanical type. In such trip meters a mechanical counter including a numeral device is driven via reduction gears by a drive shaft operatively connected to the transmission or other mechanism of the vehicle. When the driver of the vehicle intends to measure a distance between two points he will drive between, the driver resets the trip meter to zero so that the trip meter will count over the distance travelled, from zero. The trip meter is used not only for merely measuring the travelled distance but also for estimating the remaining distance to a goal or an objective point when the driver is aware of the distance between the two points, i.e. the starting point and the objective point. In order to ascertain the remaining distance on the way to the objective point the driver, however, must subtract the actually travelled distance which is displayed from the known distance by mental calculation.

For eliminating the inconvenience of such mental calculations, a trip meter which displays the remaining distance is desirable. Such a trip meter can be easily imagined since it is possible to ascertain the remaining distance by reducing a preset distance (numerals) in an opposite manner thereby subtracting the actually travelled distance from a preset distance. However, this type of a trip meter can provide only a single distance remaining to the goal of a predetermined course. In other words, such a trip meter cannot provide a distance remaining to a next guide point on the way to the goal in addition to the distance remaining to the goal of the predetermined course.

SUMMARY OF THE INVENTION

The present invention has been developed in order to overcome the above mentioned drawbacks of the conventional type trip meters.

If the vehicle driver is aware of the fact that the course which will be traversed is divided into a series of sub distances by a series of guide points, the trip meter according to the present invention can be preset so that not only the distance remaining to the objective point can be ascertained but also the distance to be covered before reaching the next guide point.

According to the present invention an electronic trip meter with an alarm for an automotive vehicle, which comprises a travelled distance circuit, a memory circuit, a modification circuit, first and second comparators, an alarm, first and second counters, a subtractor, a display circuit and other auxiliary circuits, is provided. A plurality of sub distances defined by a series of guide points along a predetermined course is stored in the memory circuit while a total distance between a starting point and a goal of the course is preset in the second counter.

The modification circuit produces an output signal indicative of a distance shorter than a distance indicated by the output signal of the memory circuit. The alarm is energized when the vehicle travels over a predetermined distance indicated by the modification circuit output signal for informing the vehicle driver that the vehicle is close to one of guide points along the travelling course or close to the goal. The subtractor produces a signal indicative of a remaining distance to a nearest guide point in accordance with the output signals of the memory circuit and the first counter which produces an output signal indicative of a distance actually travelled by the vehicle by counting a number of pulses produced in accordance with a predetermined travelled distance. The second counter produces a signal indicative of a remaining distance to the goal by subtracting the actually travelled distance from the preset total distance. One of the remaining distance to the nearest (next) guide point and the remaining distance to the goal is selectively supplied to the display circuit via the selection circuit for displaying the same.

It is therefore, an object of the present invention to provide an electronic trip meter with an alarm for an automotive vehicle in which a distance remaining to a next guide point and a distance remaining to an objective point are easily ascertained.

Another object of the present invention is to provide such a trip meter in which the alarm is utilized for informing the vehicle driver that a distance remaining to a guide point or a goal is less than a predetermined distance.

Further object of the present invention is to provide such a trip meter in which a distance travelled backward by the vehicle is compensated for.

Yet further object of the present invention is to provide such a trip meter in which a distance actually travelled from the starting point may be displayed.

Still further object of the present invention is to provide such a trip meter in which a distance remaining to a next guide point may be displayed whenever the vehicle driver wishes to ascertain it.

Still further object of the present invention is to provide such a trip meter in which various navigational signs may be displayed when the vehicle is close to each guide point.

BRIEF DESCRIPTION OF THE DRAWINGS

These and other objects and features of the present invention will become more readily apparent from the following detailed description of the preferred embodiments taken in conjunction with the accompanying drawings in which:

FIG. 3 shows in block diagram form a second preferred embodiment of the trip meter according to the present invention;

FIG. 4 shows in block diagram form a third preferred embodiment of the trip meter according to the present invention;

FIG. 5 shows in block diagram form a fourth preferred embodiment of the trip meter according to the present invention.

DETAILED DESCRIPTION OF THE PREFERRED EMBODIMENT

Figure 1:
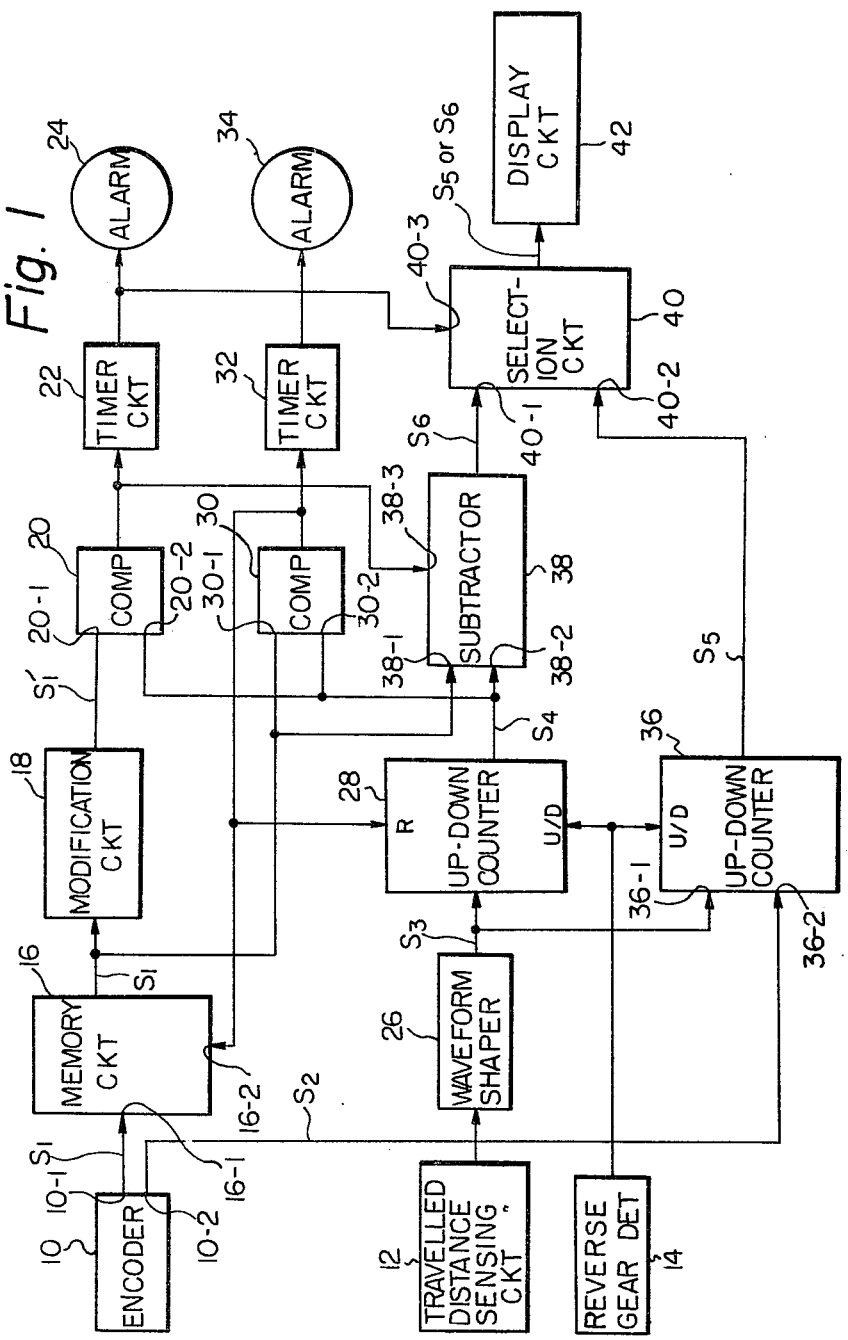
FIG. 1 shows in block diagram form a first preferred embodiment of the trip meter according to the present invention.

FIG. 1 illustrates a first preferred embodiment of the trip meter according to the present invention. The circuitry arrangement of the trip meter consists of an encoder 10, a travelled distance sensing circuit 12, a reverse gear detector 14, a memory circuit 16, a modification circuit 18, a first digital comparator 20, a first timer circuit 22, a first alarm 24, a waveform shaper 26, a first up-down counter 28, a second digital comparator 30, a second timer circuit 32, a second alarm 34, a second up-down counter 36, a subtractor 38, a selection circuit 40, and a display circuit 42.

Figure 6:
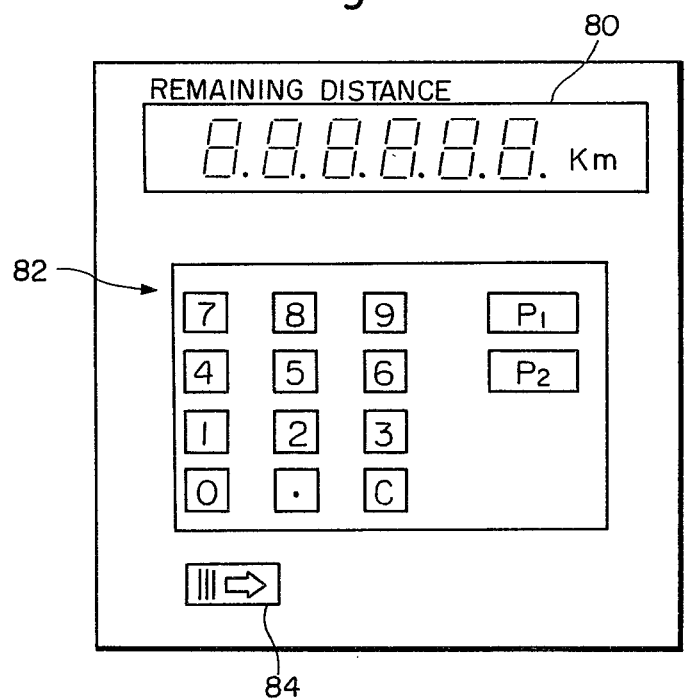
FIG. 6 shows a front elevation of an operating set utilized for the first preferred embodiment shown in FIG. 1 of the trip meter according to the present invention.

The encoder 10 includes a keyboard (not shown but is shown in FIG. 6) and a decimal-binary converter such as a BCD (binary coded decimal) circuit. The encoder 10 has first and second outputs 10-1 and 10-2 which are respectively connected to an input of the memory circuit 16 and to a second input 36-2 of the second up-down counter 36. The memory circuit 16 includes a plurality of addressed memories (not shown) the address of which is specified in accordance with a signal applied to the control terminal 16-2 thereof. The output of the memory circuit 16 is connected to an input of the modification circuits 18 the output of which is connected to a first input 20-1 of the first digital comparator 20. The output of the first digital comparator 20 is connected via the first timer circuit 22 to the first alarm 24. The output of the first digital comparator 20 is further connected to a control terminal 38-3 of the subtractor 38. The output of the first timer 22 is connected to a control terminal 40-3 of the selection circuit 40. The output of the memory circuit 16 is further connected to a first input of the second digital comparator 30 the output of which is connected via the second timer 32 to the second alarm 34. The output of the second digital comparator 30 is connected to the control terminal 16-2 of the memory circuit 16 and to a reset terminal "R" of the first up-down counter 28. The output of the memory circuit 16 is further connected to a first input 38-1 of the subtractor 38 the output of which is connected to a first input 40-1 of the selection circuit 40.

The travelled distance sensing circuit 12 includes a pulse generator (not shown) which generates a pulse each time the vehicle travels a predetermined distance. The pulse generator may be operatively connected to a driveshaft of the transmission (not shown) or to the odometer (not shown) of the vehicle so as to be responsive to a travelled distance. With this arrangement the travelled distance sensing circuit 12 produces a train of pulses as the vehicle moves. The output of the travelled distance sensing circuit 12 is connected to an input of the waveform shaper 26, such as a Schmitt trigger circuit, so that a train of pulses of a logic level is obtained at the output of the waveform shaper 26. The output of the waveform shaper 26 is connected to an input of the first up-down counter 28 and to a first input 36-1 of the second up-down counter 36. The output of the first up-down counter 28 is connected to a second input 20-2 of the first digital comparator 20, to a second input 30-2 of the second digital comparator 30, and to a second input 38-2 of the subtractor 38. The output of the second up-down counter 36 is connected to a second input 40-2 of the selection circuit 40 the output of which is connected to an input of the display circuit 42.

The reverse gear detector 14 may be a micro switch operatively connected to a gear-shift lever (not shown) of the vehicle. The reverse gear detector 14 is arranged to produce a logic "1" signal when the gears of the transmission is shifted to a reverse gear position. If desired, however, the reverse gear detector 14 may be a relay (not shown) interposed in a reversing lamp circuit of the vehicle. The output of the reverse gear detector 14 is connected to up-down control terminals U/D of the first and second up-down counters 28 and 36. The output of the second up-down counter 36 is connected to a second input 40-2 of the selection circuit 40.

The functions and the operations of the trip meter shown in FIG. 1 will be described hereinbelow. Assuming a vehicle driver intends to drive from a starting point $A_0$ to a final goal or an objective point $A_5$ via a plurality of guide points $A_1$, $A_2$, $A_3$, and $A_4$, the distances therebetween are known, the vehicle driver is supposed to preset the known distances by using the keyboard of the encoder 10.

Figure 2:
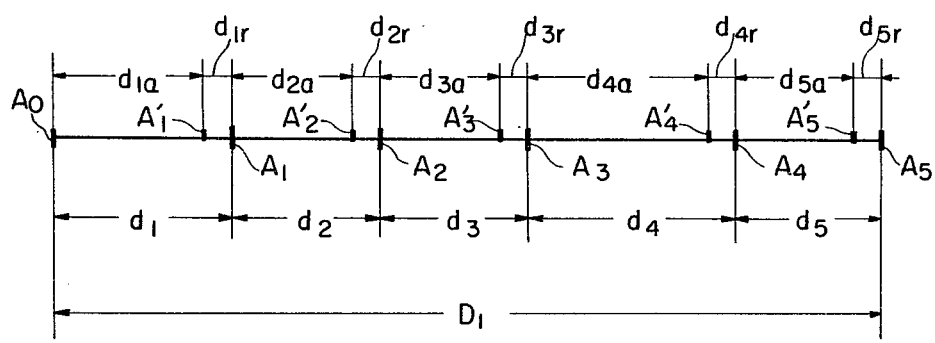
FIG. 2 shows a schematic travelling course for the sake of the explanation of the functions of the trip meter according to the present invention.

FIG. 2 illustrates a schematic course to be travelled including the above mentioned starting point $A_0$, the final objective point $A_5$, and four guide points $A_1$, $A_2$, $A_3$ and $A_4$. As shown the total distance between the starting point $A_0$ and the final objective point $A_5$ is expressed in terms of $D_1$, while sub distances between the starting point $A_0$ and the first guide point $A_1$, between the first and second guide points $A_1$ and $A_2$, between the second and third guide points $A_2$ and $A_3$, between the third and fourth guide points $A_3$ and $A_4$, between the fourth guide point $A_4$ and the final objective point $A_5$ are respectively expressed in terms of $d_1$, $d_2$, $d_3$, $d_4$ and $d_5$.

Before leaving the starting point the vehicle driver presets the sub distances $d_1$ to $d_5$ inclusive in specified addressed memories of the memory circuit 16. Then the vehicle driver presets the total distance $D_1$ into the second up-down counter 36. Although the sub distances $d_1$ to $d_5$ and the total distance $D_1$ are respectively preset by operating the keyboard, if the memory circuit 18 includes a summing circuit (adder), the summing circuit may be utilized for producing a signal indicative of the sum of the all sub distances $d_1$ to $d_5$. Since the sum of the sub distances corresponds to the total distance $D_1$, the output signal of the summing circuit may be applied to the second up-down counter 36 so that the driver does not have to operate the keyboard for presetting the total distance $D_1$.

The modification circuit 18 may be a multiplier or a subtractor which produces an output signal indicative of a distance shorter than that represented by an input signal derived from the memory circuit 16. Assuming the first sub distance $d_1$ is 50 Km and the multiplication degree of the multiplier is 0.9, the output signal of the modification circuit, i.e. a multiplier in this case, indicates 45 Km. On the other hand, if the subtrahend corresponds to 5 Km while the same sub distance $d_1$ as the above is applied, the output signal of the modification circuit, i.e. a subtractor in this case, indicates 45 km. It will be understood that the modification circuit 18 produces a signal indicative of a distance $d_{1a}$ between starting point $A_0$ and a point $A'_1$ which is ahead of the first guide point $A_1$ by a predetermined distance $d_{1r}$ as shown in FIG. 2 in accordance with a signal indicative of the first sectional distance $d_1$. In the same manner, the modification circuit 18, in turn, produces a signals indicative of distances $d_{2a}$, $d_{3a}$, $d_{4a}$, and $d_{5a}$ in accordance with the second to fifth sectional distances $d_2$, $d_3$, $d_4$, and $d_5$. These distances $d_{1a}$ to $d_{5a}$ are referred to as modified distances hereinbelow.

The first sub distance $d_1$ is read out before the vehicle starts from the starting point $A_0$. As the vehicle starts from the starting point $A_0$ and keeps travelling, the travelled distance sensing circuit 12 produces a train of pulses, the number of which indicates a travelled distance. A pulse train signal $S_3$ is obtained by the waveform shaper 26 in response to the train of pulses. The pulse train signal $S_3$ is then applied to the input of the first up-down counter 28 and to the first input 36-1 of the second up-down counter 36. The first up-down counter 28 is arranged to function as an up (adding) counter when the up-down control terminal U/D thereof is applied with a logic "0" signal, while the second up-down counter 36 is arranged to function as a down (subtracting) counter when the up-down control terminal U/D thereof is fed with a logic "0" signal. The first up-down counter 28, therefore, counts the number of pulses of the signal $S_3$ from zero to produce an output signal $S_5$ indicative of the distance actually travelled by the vehicle.

On the other hand, the second up-down counter 36 produces an output signal $S_5$ indicative of the remaining distance by subtracting the actually travelled distance from the preset total distance $D_1$. The remaining distance represented by the signal $S_5$ is of course the distance remaining to the final goal $A_5$. Since the control terminal 40-3 of the selection circuit 40 is fed with a logic "0" signal, the selection circuit 40 permits the transmission of the signal $S_5$ derived from the second up-down counter 36. With this arrangement, the distance remaining to the final goal $A_5$ is displayed in the form of numerals at the display circuit 42.

When the vehicle reaches the point $A'_1$, the first digital comparator 20 produces an output signal because the actually travelled distance indicated by the signal $S_4$ exceeds the first modified distance $d_{1a}$ represented by the signal $S'_1$. Upon presence of the output signal of the first digital comparator 20, the timer circuit 22 which may be a monostable multivibrator produces a pulse signal the pulse width of which corresponds to several seconds so that the first alarm 24 is energized for a predetermined period of time. Meanwhile the output pulse of the timer circuit 22 is applied to the control terminal 40-3 of the selection circuit 40 for permitting the transmission of the signal $S_6$ applied to the first input 40-1 of the same. The subtractor 38 is responsive to the output signal $S_1$ of the memory circuit 16 and to the output signal $S_4$ of the first up-down counter 28 and thus produces the output signal $S_6$ indicative of the difference between the stored first sub distance $d_1$ and the actually travelled distance. The subtractor 38 is arranged to produce the output signal $S_6$ in response to a signal applied to the control terminal 38-3 thereof from the first digital comparator 20, so that the output signal $S_6$ indicates a distance $d_{1r}$ since $d_{1r} = d_1 - d_{1a}$ as shown in FIG. 2. The signal $S_6$ is applied to the display circuit 42 for displaying the distance $d_{1r}$ which indicates a distance remaining to the first guide point $A_1$ for the above mentioned predetermined period of time. The first alarm 24 as well as the second alarm 34 may be buzzers, bells or lamps and the like. When the first alarm 24 is energized, the first alarm 24 emits an alarm signal such as a buzzer or a light for informing the vehicle driver that the distance remaining to the first guide point $A_1$ is within a predetermined distance $d_{1r}$. Upon presence of the alarm signal the vehicle driver is supposed to look at the numerals shown in the display circuit 42 so that he will ascertain the distance $d_{1r}$ remaining to the first guide point $A_1$.

When the predetermined period of time is over, the display circuit 42 displays the distance remaining to the final objective point $A_5$ again since the signal $S_5$ is fed via the selection circuit 40 to the display circuit 40 upon absence of the signal to the control terminal 40-3 of the selection circuit 40. As the vehicle arrives at the first guide point $A_1$, the second digital comparator 30 produces an output signal since the first input 30-1 thereof is fed with the signal $S_1$ indicative of the first sectional distance $d_1$, while the second input 30-2 of the same is fed with the signal $S_4$ indicative of the actually travelled distance which corresponds to the preset sub distance $d_1$. Upon presence of the output signal of the second digital comparator 30, the second alarm 34 is energized via the second timer 32 for a predetermined period of time in the same manner as the first alarm 24. The second alarm 34 thus issues an alarm signal which may be of a different tone of a sound or a different color of light from that of the first alarm 24. Upon presence of the output signal of the second digital comparator 30, the memory circuit 16 starts reading out the second sub distance $d_2$ while the first up-down counter 28 is reset to zero. With this provision, the modification circuit 18 and the second digital comparator 30 receive the signal now indicative of the second sub distance $d_2$ while the first up-down counter 28 starts counting the number of pulses of the signal $S_3$ from zero again. Therefore, the modification circuit 18 produces an output signal $S'_1$ now indicative of a modified distance $d_{2a}$ shown in FIG. 2 so that the first digital comparator 20 produces an output signal when the actually travelled distance from the first objective point $A_1$ indicated by the signal $S_4$ exceeds the modified distance $d_{2a}$ indicated by the signal $S'_1$ in the same manner. The trip meter functions in the same manner as in the travel between the starting point $A_0$ and the first objective point $A_1$. It will be understood that the trip meter functions in the same manner for the following third, fourth and fifth sections or legs the distances of which are respectively designated by $d_3$, $d_4$, and $d_5$.

Although the above mentioned second timer circuit 32 and the second alarm 34 are utilized for informing the vehicle driver that the vehicle has reached one of the guide points or the final objective point $A_5$, these two circuits 32 and 34 may be omitted if such an alarm is unnecessary.

The above described functions and operations of the trip meter are performed when the vehicle moves forward. When the vehicle moves backward, however, the reverse gear detector 14 produces an output signal with which the first and second up-down counters 28 and 36 are respectively switched to count the number of pulses in the opposite direction. Therefore, the actually travelled distance indicated by the output signal $S_4$ of the first up-down counter 28 decreases as much as the distance travelled backward. Meanwhile the remaining distance indicated by the signal $S_5$ is increased as much as the same distance travelled backward. This means that the actually travelled distance and the distance remaining are respectively compensated for when the vehicle travels backward.

Reference is now made to FIG. 3 which shows a second preferred embodiment of the trip meter according to the present invention. The second embodiment has the same construction as the first preferred embodiment except that a NOT gate 50, a first switch 52, and a second switch 54 are additionally provided. The first switch 52 and the second switch 54 are incorporated in a single gang switch as shown to be related by a dotted line.

The output of the reverse gear detector 14 is connected to the up-down control terminal U/D of the first up-down counter 28, to a first terminal of the first switch 52, and to an input of the NOT gate 52 the output of which is connected to a second terminal of the first switch 52. A movable contact of the first switch 52 is connected to the up-down control terminal U/D of the second up-down counter 36. The second output 10-2 of the encoder 10 is connected via the second switch 54 to the second input 36-2 of the second up-down counter 36. The gang switch which includes the first and second switches 52 and 54 is of a manual type and is utilized for selecting a distance to be displayed from a remaining distance to the final goal $A_5$ and the actually travelled distance from the starting point $A_0$. In other words, when the movable contacts of the first and second switches 52 and 54 assume their upper positions as shown, the second up-down counter 36 functions as a down (subtracting) counter in the same manner as in the first preferred embodiment and when the movable contacts assume their lower positions, the second up-down counter 36 functions as an up (adding) counter for producing an output signal $S_5$ indicative of the distance actually travelled by the vehicle from the starting point $A_0$. With this provision, the vehicle driver may select the remaining distance or the actually travelled distance to be displayed before leaving the starting point $A_0$.

Reference is now made to FIG. 4 which illustrates a third preferred embodiment of the trip meter according to the present invention. The third preferred embodiment has the same construction as the first preferred embodiment except that first and second OR gates 60 and 62, and a manual switch 64 are additionally provided. A first input of the first OR gate 60 is connected to the output of the first digital comparator 20 while the second input of the first OR gate 60 is connected to an output of the manual switch 64. The output of the first OR gate is connected to the control terminal 38-3 of the subtractor 38. A first input of the second OR gate 62 is connected to the output of the first timer circuit 22 while the second input of the second OR gate 62 is connected to the output of the manual switch 64. The output of the second OR gate 62 is connected to the control terminal 40-3 of the selection circuit 40. The manual switch 64 is arranged to produce a logic "1" pulse signal when operated. With this arrangement, control signals are respectively supplied to the control terminals 38-3 and 40-3 when the manual switch 64 is operated. Therefore, the vehicle driver may operate the manual switch 64 whenever he wishes to see the remaining distance to a nearest guide point at the display circuit 42.

The above described three embodiments are employed for displaying various distances such as the remaining distances to the final objective point, a nearest (next) guide point or the actually travelled distance. However, it is possible to display not only these distances but also various navigational signs, for instance "TURN RIGHT" and "TURN LEFT."

Hence, reference is now made to FIG. 5 which shows a fourth preferred embodiment of the trip meter according to the present invention. The construction of the fourth embodiment is the same as that of the first embodiment except that a gate circuit 70 and a second display circuit 72 are additionally provided. The output of the memory circuit 16 is connected to an input 70-1 of the gate circuit 70 the output of which is connected to an input of the second display circuit 72. The output of the first timer circuit 22 is connected to a control terminal 70-2 of the gate circuit 70. In the fourth embodiment the memory circuit 16 is utilized for not only storing the various known distances but also for storing various naviational signal signs such as "TURN RIGHT."

Before leaving the starting point $A_0$ the vehicle driver is supposed to encode all the naviational signs to be displayed at each guide points $A_1$ to $A_4$ for storing the encoded signal in each specified addressed memory together with the sectional distances $d_1$ to $d_5$. When the vehicle travels over the first modified distance $d_{1a}$, the output signal of the memory circuit 16 is fed via the gate circuit 70 to the second display circuit 72 for displaying the stored navigational sign at the second display circuit 72. As the navigational signs various symbols such as arrow heads may also be used. The navigational signs will help the vehicle driver and careless mistakes such as a turn in a wrong direction at each guide point is effective prevented.

FIG. 6 illustrates a front elevation of an operating set utilized for the first preferred embodiment of the trip meter according to the present invention. The operating set consists of a display portion 80, a keyboard panel 82, and a key lock switch 84. The keyboard panel 82 includes ten keys 0, 1, 2, 3, 4, 5, 6, 7, 8 and 9, a decimal key ".", a clear key "C," a first preset key "$P_1$," and a second preset key "$P_2$." The ten keys 0 to 9 and the decimal key "." are used for encoding the sub distances $d_1$, $d_2$, $d_3$. . . and the total distance $D_1$. The first and second preset keys $P_1$ and $P_2$ are used for storing the above mentioned distances to the memory circuit 12 and to the second up-down counter 36 respectively. In order to store the sub distances $d_1$, $d_2$, $d_3$ . . . in each specified addressed memory in the memory circuit 16 the first preset switch $P_1$ is operated each time. The clear key C is used for cancelling erroneous signals produced by misoperation of the ten keys and the decimal key.

The key lock switch 84 disposed at the lower portion of the front panel of the operation set is utilized for disconnecting various keys on the key board 82 from the corresponding circuit. Therefore, when the key lock switch 84 is turned on, operations of the keys on the keyboard 82 do not influence the trip meter at all so that an undesirable operation of the trip meter due to a careless touch to the keys is prevented.

The display portion 80 includes a plurality of numeral display elements such as light emitting diodes or liquid crystals. A symbol of "Km" is placed at the right most portion of the display portion 80 for indicating that the numerals shown have a unit of Km. A sign of "REMAINING DISTANCE" is written above the display portion 80 for indicating that the shown numerals indicate a remaining distance rather than a distance actually travelled. It is preferable to display numbers as far as the first or second decimal place so that the remaining distances is accurately obtained.

The operating set of the trip meter is preferably mounted on the instrument panel of the vehicle so that the vehicle driver readily operate the keys on the keyboard 82 and see the display portion 90. Although the operating set shown in FIG. 6 is for the first preferred embodiment of the trip meter, almost the same operating set may be utilized for the second, third and fourth embodiments with small changes.

The trip meter according to the present invention is constructed by discrete elements as described hereinabove, but the trip meter may be substituted by a micro computer.

Obviously many modifications and variations of the present invention are possible in the light of the above teachings. It is therefore to be understood that within the scope of the appended claims the invention may be practiced otherwise than as specifically described.

What is claimed is:

1. An electronic trip meter with an alarm for an automotive vehicle, comprising:
   (a) encoding means for producing a plurality of first signals which are indicative of sub distances along a course, and a second signal indicative of a total distance between a starting point and an objective point;
   (b) travelled distance sensing means for producing a third signal in the form of a pulse train, the number of pulses of said third signal being indicative of a distance actually travelled by said vehicle;
   (c) memory circuit for storing the sub distances represented by said first signals, each of said first signals being read out in turn in response to a reset signal applied thereto;
   (d) modification circuit for producing an output signal indicative of a distance shorter than that represented by the read out signal derived from said memory circuit;
   (e) first counting means for producing a fourth signal indicative of a distance travelled by said vehicle in accordance with said third signal;
   (f) second counting means for producing a fifth signal indicative of the difference between said total distance and said distance travelled;
   (g) first comparator for producing an output signal when the distance travelled exceeds said distance represented by the modification output signal;
   (h) second comparator for producing an output signal when the distance travelled exceeds said distance represented by the memory circuit output signal, said output signal of said second comparator being utilized as said reset signal;
   (i) a timer circuit responsive to said output signal of said first comparator for producing a signal for a predetermined period of time;
   (j) an alarm responsive to the output signal of timer circuit;
   (k) a subtractor for producing a sixth signal indicative of the difference between the distance represented by said fourth signal and the distance represented by the memory circuit output signal, said subtractor producing said sixth signal only when the first comparator output signal is applied thereto;
   (l) a selection circuit for selectively transferring one of said fifth and sixth signals in response to the timer circuit output signal; and
   (m) a display circuit for displaying a distance in accordance with the selection circuit output signal.

2. An electronic trip meter as claimed in claim 1, further comprising a second timer circuit responsive to said second comparator for producing a signal for a predetermined period of time, and a second alarm responsive to the output of said second timer circuit.

3. An electronic trip meter as claimed in claim 2, wherein said second timer circuit comprises a monostable multivibrator.

4. An electronic trip meter as claimed in claim 1, wherein said first and second counting means are up-down counters.

5. An electronic trip meter as claimed in claim 4, further comprising a reverse gear detector for producing an output signal when the gear of the transmission of said vehicle is shifted into a reverse gear position, said output signal of said reverse gear detector being utilized for controlling the up-down state of said first and second up-down counters.

6. An electronic trip meter as claimed in claim 5, further comprising a NOT gate the input of which is connected to the output of said reverse gear detector, a first switch for selectively supplying the output of said reverse gear detector and the output of said NOT gate, and a second switch for selectively supplying said second signal to said second up-down counter.

7. An electronic trip meter as claimed in claim 1, further comprising a first OR gate, a second OR gate, and a switch for producing a logic signal when operated, said first OR gate being responsive to said output of said first comparator and said switch output signal for producing an output signal with which said subtractor starts functioning, said second OR gate being responsive to said output of said timer circuit and to said switch output signal for producing an output signal with which said selection circuit is controlled.

8. An electronic trip meter as claimed in claim 1, further comprising a gate circuit for permitting the transmission of the memory output signal in response to the timer output signal, and a second display circuit for displaying navigational signs in accordance with the gate output signal, said encoder and said memory circuit being arranged to store navigational signs together with said sub distances.

9. An electronic trip meter as claimed in claim 1, wherein said modification circuit comprises a multiplier.

10. An electronic trip meter as claimed in claim 1, wherein said modification circuit comprises a subtractor.

11. An electronic trip meter as claimed in claim 1, wherein said timer circuit comprises a monostable multivibrator.

12. An electronic trip meter with an alarm for an automotive vehicle comprising:
    means for setting a first preset distance and a second preset distance which is longer than said first preset distance;
    first means for producing a signal indicative of a modified distance which is shorter than said first preset distance;
    second means for producing a signal indicative of a distance travelled by the vehicle;
    third means responsive to said first and second means for producing an output signal when said distance travelled by said vehicle exceeds said modified distance;
    fourth means responsive to said output signal of said third means for producing an alarm signal;
    fifth means responsive to said first and second means for producing a signal indicative of the difference between said first preset distance and said distance travelled by said vehicle upon presence of said output signal of said third means;

sixth means for displaying a distance corresponding to said difference obtained by said fifth means;

means for permitting the transmission of said signal from said fifth means for a predetermined period of time when said output signal of said third means is fed thereto; and means for producing a signal indicative of the difference between said second preset distance and said distance travelled by said vehicle;

said sixth means displaying a distance corresponding to said difference between said second preset distance and said distance travelled by said vehicle except for said predetermined period of time.

* * * * *